United States Patent [19]

Tsuneta et al.

[11] Patent Number: 5,213,846
[45] Date of Patent: May 25, 1993

[54] CORRISON RESISTANT COATING COMPOSITION

[75] Inventors: Kazuyoshi Tsuneta, Tochigi; Masanori Nagai, Otawara; Osamu Ogawa; Osamu Tanida, both of Tochigi, all of Japan

[73] Assignee: Dai Nippon Toryo Co., Ltd., Osaka, Japan

[21] Appl. No.: 781,668

[22] Filed: Oct. 24, 1991

Related U.S. Application Data

[63] Continuation of Ser. No. 582,170, Sep. 14, 1990, abandoned.

[30] Foreign Application Priority Data

| Sep. 27, 1989 | [JP] | Japan | 1-251363 |
| Sep. 27, 1989 | [JP] | Japan | 1-251364 |
| Sep. 27, 1989 | [JP] | Japan | 1-251365 |
| Sep. 27, 1989 | [JP] | Japan | 1-251366 |
| Oct. 3, 1989 | [JP] | Japan | 1-258042 |
| Oct. 3, 1989 | [JP] | Japan | 1-258043 |

[51] Int. Cl.$^5$ .......................... B05D 3/02; C04B 9/02
[52] U.S. Cl. ................................ 427/386; 427/388.2; 427/388.5; 106/14.41; 106/14.44
[58] Field of Search .......................... 106/14.05–14.44; 528/104; 523/166; 427/386, 388.2, 388.5

[56] References Cited

U.S. PATENT DOCUMENTS

| 4,920,164 | 4/1990 | Sasaki et al. | 523/466 |
| 4,923,912 | 5/1990 | Sasaki et al. | 523/466 |

FOREIGN PATENT DOCUMENTS

| 0302823 | 2/1989 | European Pat. Off. |
| 03020350 | 1/1991 | European Pat. Off. |
| D. 3712733 | 11/1988 | Fed. Rep. of Germany |
| 2448565 | 9/1980 | France |
| 1203422 | 8/1989 | Japan |

OTHER PUBLICATIONS

Patent Abstracts of Japan, vol. 9, No. 59 (C-270) [1782]. Mar. 15th, 1985; & JP-A-59 193 970 (Nippon Paint) Nov. 11, 1984 *whole abstract*.
Database WPIL, accession No. 84-103551 [17] Derwent Publications, London, GB; & JP-A-59-045 365 (Kubota) Mar. 14, 1984 *whole abstract*.

Primary Examiner—Mark L. Bell
Assistant Examiner—Margaret Einsman
Attorney, Agent, or Firm—Oblon, Spivak, McClelland, Maier & Neustadt

[57] ABSTRACT

A corrosion resistant coating composition comprising (i) 100 parts by weight of a bisphenol type epoxy resin comprising bisphenol skeletons and epichlorohydrin skeletons and having at least two epoxy groups per molecule, said bisphenol skeletons comprising bisphenol A skeletons and bisphenol F skeletons in a weight ratio of from 95:5 to 60:40, and (ii) from 5 to 400 parts by weight of silica particles.

14 Claims, No Drawings

CORRISON RESISTANT COATING COMPOSITION

This application is a continuation of application Ser. No. 07/582,170, filed on Sep. 14, 1990, now abandoned.

The present invention relates to a coating composition capable of forming on a steel plate a coating layer excellent in corrosion resistance and cationic electrodeposition coating properties.

In recent years, surface-treated steel plates having good corrosion resistance have been widely used as steel plates for various applications such as for automobile bodies and household electric appliances.

Zinc-plated steel plates may be mentioned as typical examples of such surface-treated steel plates. However, when applied as interior plates of automobile bodies, or when applied to envelope structures or hemmed structures, they are unable to adequately satisfy the required properties, and it has been common to employ a method wherein an organic coating layer is applied to such a plated steel plate and a cationic electrodeposition coating is further applied to improve the corrosion resistance. Therefore, the surface-treated steel plates are now required to have not only high corrosion resistance by itself, but also good cation electrodeposition coating properties.

However, there has been no surface-treated steel plate developed which practically satisfy these two requirements.

For example, the surface-treated steel plate having a coating containing a large amount of zinc powder as disclosed in Japanese Examined Patent Publication No. 24230/1970 or No. 6882/1972, has a problem that the coating is susceptible to peeling by press working, and the corrosion resistance is not adequate.

The surface-treated steel plate having an organic and inorganic composite coating applied to a zinc alloy-plated steel plate as disclosed in U.S. Pat. No. 4,775,600, European Patent 230,320, Japanese Unexamined Patent Publication No. 108292/1982, No. 50179/1985, No. 50180/1985, No. 99938/1988, No. 8033/1989 or No. 8034/1989, or Japanese Examined Patent Publication No. 34406/1979, has a problem that coating defects such as gas pin holes or craters are likely to form in the cation electrodeposition coating, since the conductivity of the coating necessary for the cation electrodeposition coating properties is non-uniform.

Further, the surface-treated steel plate having a coating containing a large amount of a conductive substance such as zinc, carbon black or aluminum, applied as disclosed in Japanese Unexamined Patent Publication No. 60766/1986 or No. 83172/1988, or Japanese Examined Patent Publication No. 2310/1988, has good conductivity and is excellent in the cation electrodeposition coating properties, but it is inferior in the flatness when a thin film is formed and thus has a poor appearance of the coating. Further, the coating is susceptible to peeling by working, and the corrosion resistance is not adequate.

The surface-treated steel plate having a coating containing a hydrophilic polyamide resin for an improvement of the cation electrodeposition coating properties, applied to a zinc alloy-plated steel plate, as disclosed in GB2194249, has a problem that the coating is susceptible to peeling by alkali treatment for electrodeposition, and the corrosion resistance is not adequate.

Further, a method of forming cracks on a coating film of a surface-treated steel plate having a thin coating film provided thereon, by e.g. roll skin pass, in order to improve the cation electrodeposition coating properties, as disclosed in Japanese Unexamined Patent Publication No. 11733/1987, has a problem in the corrosion resistance because of the cracks, in addition to an increase in number of the treating steps.

Under these circumstances, it is an object of the present invention to provide a coating composition to obtain a surface-treated steel plate excellent in corrosion resistance and cation electrodeposition coating properties.

The present invention provides a corrosion resistant coating composition comprising (i) 100 parts by weight of a bisphenol type epoxy resin comprising bisphenol skeletons and epichlorohydrin skeletons and having at least two epoxy groups per molecule, the bisphenol skeletons comprising bisphenol A skeletons and bisphenol F skeletons in a weight ratio of from 95:5 to 60:40, and (ii) from 5 to 400 parts by weight of silica particles.

Now, the present invention will be described in detail with reference to the preferred embodiments.

The bisphenol type epoxy resin (i) constituting the coating composition of the present invention, is a resin comprising bisphenol skeletons and epichlorohydrin skeletons formed by subjecting bisphenols comprising bisphenol A and bisphenol F, and epichlorohydrin to a condensation reaction in accordance with a usual method and having at least two epoxy groups per molecule. It is preferably a resin having a molecular weight of from about 500 to 100,000. The condensation reaction of the bisphenols and epichlorohydrin is preferably conducted by mixing bisphenol A and bisphenol F and simultaneously reacting them with epichlorohydrin. However, an epoxy resin obtained by reacting bisphenol A with epichlorohydrin and further adding and reacting bisphenol F thereto, or an epoxy resin obtained by reacting bisphenol F with epichlorohydrin and further adding and reacting bisphenol A thereto, is also included in the present invention.

A bisphenol A type epoxy resin obtained from bisphenol A provides a coating layer which is excellent in the water resistance and chemical resistance, and it is also excellent in the adhesion to a steel plate and in the adhesion to a overcoating layer. On the other hand, the coating layer is hard and poor in the flexibility, and it has electrical insulating properties and thus is rather poor in the cation electrodeposition coating properties.

Therefore, the present inventors blended a bisphenol F type epoxy resin to the bisphenol A type epoxy resin, but it was found that the corrosion resistance decreased and no improvement in the cation electrodeposition coating properties was observed. On the other hand, when a bisphenol type resin comprising bisphenol skeletons and epichlorohydrin skeletons and having at least two epoxy groups per molecule, is used wherein said bisphenol skeletons comprise bisphenol A skeletons and bisphenol F skeletons in a certain specific weight ratio, it has been unexpectedly found that not only the corrosion resistance but also the cation electrodeposition coating properties can be improved to a substantial extent. Thus, the present invention is based on these discoveries.

Namely, the bisphenol A type epoxy resin is a resin represented by the formula:

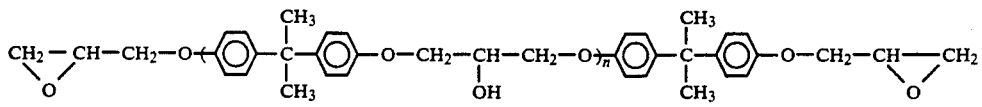

By substituting and/or introducing bisphenol F skeletons for a part of bisphenol A skeletons in the formula, the resulting resin shows a better hydrophilic nature than the bisphenol A type epoxy resin, whereby the electrical resistance of the coating layer during the cation electrodeposition coating decreases, and the entire layer will be electrically uniform. This is believed to be the reason for the excellent cation electrodeposition coating properties. Further, the bisphenol A type epoxy resin is known to be a resin having good corrosion resistance. However, when applied as a thin coating film, it is unable to completely cover the surface roughness of the steel plate, whereby moisture or oxygen is likely to penetrate, and corrosion resistance tends to be poor. By substituting and introducing bisphenol F skeletons for a part of bisphenol A skeletons, the glass transition point will be lowered, and the resulting coating layer tends to have flexibility, whereby the moisture or oxygen penetrated in the coating layer will readily be dissipated out of the system. It is believed that the corrosion resistance is thereby improved.

In order to obtain such effects, the weight ratio of the bisphenol A skeletons to the bisphenol F skeleton is preferably within a range of from 95:5 to 60:40. If the proportion of the bisphenol A skeletons is larger than the above range, no adequate effects by the substitution with the bisphenol F skeletons will be observed. On the other hand, if the proportion of the bisphenol A skeletons is less than the above range, the coating layer tends to be so soft that the corrosion resistance and water resistance tend to be low, such being undesirable.

The above bisphenol type epoxy resin (i) may be the one wherein the epoxy groups in the resin are modified with a primary and/or secondary amine compound (hereinafter referred to simply as an amine compound) or with a polybasic acid compound. By using such a modified epoxy resin, the alkali resistance and water resistant secondary bond strength of the resulting coating layer will be improved over the case where the corresponding non-modified epoxy resin is used.

Such a modified epoxy resin (i) is preferably modified to such an extent that from 30 to 100% of epoxy groups in the bisphenol type epoxy resin is modified with the amine compound or the polybasic acid compound. If the modification is less than this range, the effects for the improvement of alkali resistance tends to be low.

Typical examples of the amine compound include n-propylamine, iso-propylamine, n-butylamine, sec-butylamine, tert-butylamine, diethylamine, ethylenediamine, diethylenetriamine, triethylenediamine, tetraethylenediamine, propylenediamine, N-methylpiperazine, ethanolamine, diethanolamine, N-methylethanolamine, iso-propanolamine, diisopropanolamine, n-propanolamine, ethylethanolamine, and 3-methanolpiperidine.

Typical examples of the polybasic acid compound include isophthalic acid, terephthalic acid, succinic acid, adipic acid, fumaric acid, itaconic acid, citraconic acid, maleic anhydride, phthalic anhydride, succinic anhydride, citric acid, tartaric acid, rosin maleic anhydride and benzene tricarboxylic anhydride.

The silica particles (ii) constituting the coating composition of the present invention are incorporated to further impart high corrosion resistance. Typical examples include colloidal silica dispersed in an organic solvent and having a particle size of from 1 to 500 m$\mu$m or powdery fumed silica having a particle size of from 1 to 500 m$\mu$m. The colloidal silica dispersed in an organic solvent is a colloidal silica dispersed in an organic solvent such as methyl alcohol, ethyl alcohol, propyl alcohol, butyl alcohol, ethyl cellosolve, ethylene glycol, dimethylacetamide or dimethylformamide. Commercial products include, for example, OSCAL 1132, 1232, 1332, 1432, 1532, 1622, 1722 and 1724 (tradenames, manufactured by Catalysts & Chemicals Industries Co., Ltd.); and MA-ST, IPA-ST, NBA-ST, IBA-ST, EG-ST, ETC-ST, DMAC-ST, AND DMF-ST (tradenames, manufactured by Nissan Chemical Industries Ltd.).

Commercial products of the powdery fumed silica include, for example, R974, R811, R812, R972, R805, T805, R202, RX200, RY200, RY300, RY380, RY180 and OX50 (tradenames, manufactured by Nippon Aerosil Company Ltd.). By incorporation of such silica particles, when a coating layer is formed, hydrogen bonding will be formed between silanol groups on the surface of the silica particles and the steel plate surface and between such silanol groups and the topcoating layer. Further, when such a coating layer is baked, the silanol groups undergo a dehydration condensation reaction, and integration of the topcoating layer-silica-steel plate will thereby be promoted, whereby the corrosion resistance will be substantially improved.

The silica particles (ii) are preferably incorporated in an amount of from 5 to 400 parts by weight (as solid) per 100 parts by weight of the bisphenol type epoxy resin (i). If the amount is less than this range, the corrosion resistance tends to be low. On the other hand, if the amount is excessive, the processability, alkali resistance and adhesion to the topcoating layer tend to decrease.

The coating composition of the present invention is a coating material comprising the above described bisphenol type epoxy resin (i) and silica particles (ii) as essential components, which preferably has a solid content of from 10 to 60% by weight.

The steel plate treated by the coating composition of the present invention is likely to be subjected to welding. Therefore, it is preferred to incorporate graphite particles (iii) to the coating composition, so that a coating layer having excellent weldability will be obtained. The graphite particles (iii) are incorporated to improve the weldability. For this purpose, the particle size thereof is preferably at most 1 $\mu$m. Typical commercial products of such graphite particles include, for example, Hitasol GO-102, Hitasol GP-60 and Hitasol GP-82 (tradenames, manufactured by Hitachi Funmatsu Yakin K. K.), and Supercorophite #15, Supercorophite #15Z, Supercorophite #15B, Prophite AS, Prophite W-300D, Baneyphite P-602, Baneyphite BP-4, Baneyphite BP-112, Baneyphite C-812 and Baneyphite C-9A (tradenames, manufactured by Nippon Kokuen Shoji K. K.).

The graphite particles (iii) are preferably incorporated in an amount of from 0.1 to 30 parts by weight (as solid) per 100 parts by weight of the bisphenol type epoxy resin (i). If the amount is less than this range, no adequate effects for improvement of the weldability will be obtained. On the other hand, if an excess amount is incorporated, processability during press processing and the corrosion resistance tend to be low.

In the present invention, a bisphenol type epoxy resin containing bisphenol F skeletons is used, whereby adequate effects are obtainable even with such a small amount of graphite particles as mentioned above. However, when a bisphenol type epoxy resin composed solely of bisphenol A skeletons without containing bisphenol F skeletons, is used, a large amount of graphite particles is required to be incorporated in order to improve the weldability.

It should also be mentioned that to improve the weldability, it is known to improve the conductivity. As a conductive substance to be incorporated in a coating material in order to improve the conductivity, it is known to employ a powder of Zn, Al, Mg, Fe, Ni, Co, Sn, Cu, Cr, Mn or an alloy thereof; a powder of Ti, Zr, V, Nb, W, Mo or an alloy thereof; a carbide powder; as well as iron phosphide powder, aluminum-doped zinc oxide powder, or a semiconductor oxide powder such as tin oxide-titanium oxide, tin oxide-barium sulfate or nickel oxide-alumina. However, with such a conductive material, white rust is likely to form, and it has a corrosion problem. Further, the specific gravity is high, whereby there is a problem from the viewpoint of the stability of the coating material due to the precipitation or coagulation. Further, conductive carbon black is also widely used. Primary particles are small in size but are likely to coagulate. Therefore, when the coating material is applied in a coated amount of from 0.5 to 4 $g/m^2$, they tend to protrude from the coating layer, and they have a problem in the processability. Whereas, graphite particles have a feature that they do not adversely affect the corrosion resistance, the stability of the coating material and the processability, as a conductive material.

To the coating composition of the present invention, other components which are commonly employed in conventional coating materials, may optionally be incorporated. Specifically, various organic solvents of hydrocarbon type, ester type, ketone type, alcohol type and amide type; cross linking agents such as a melamine resin, a benzoguanamine resin and a polyblocked isocyanate compound; organic or inorganic pigments; additives such as a dispersing agent, a precipitation-preventing agent and a leveling agent, of various resins for modification, may be incorporated.

The coating composition of the present invention is preferably employed as an undercoating material for various steel plates such as a hot dip zinc-plated steel plate, a hot dip zinc-aluminum alloy-plated steel plate, an electrolytic zinc-plated steel, an electrolytic zinc-nickel alloy-plated steel plate, an electrolytic zinc-iron alloy-plated steel plate, an electrolytic zinc-iron double layer-plated steel plate and a cold-rolled steel plated, or steel plates pre-treated by e.g. chromate treatment or phosphate treatment, which are used for automobiles, household electrical appliances, building materials, etc. However, the objects to be treated by the composition of the present invention are not restricted to such specific examples.

The coating composition of the present invention may be coated on such a steel plate by a method such as spraying, roll coating or shower coating and can be cured at a temperature of from 15° to 300° C., preferably from 100° to 250° C. Adequate performance will be obtained even with a thin layer having a thickness of about a few $\mu m$. However, the thickness may be greater.

With the surface treated-steel plate having the coating composition of the present invention applied, the resulting coating layer imparts high corrosion resistance and has flexibility for processing. Further, it provides excellent cation electrocoating properties. Thus, it is a coating material having a high practical value.

Now, the present invention will be described in further detail with reference to Examples. However, it should be understood that the present invention is by no means restricted by such specific Examples. In the Examples, "parts" and "%" mean "parts by weight" and "% by weight", respectively.

Preparation of Epoxy Resin Solution (I)

Into a three-necked flask equipped with a reflux condenser, a thermometer and a stirrer, 109.4 parts of bisphenol A, 64.0 parts of bisphenol F and an aqueous sodium hydroxide solution having 60 parts of sodium hydroxide dissolved in 600 parts of water, were added, and the mixture was heated at 50° C. for 13 minutes under stirring. Then, 116 parts of epichlorohydrin was added thereto, and the temperature was gradually raised and brought to 100° C. in 20 minutes. The mixture was maintained at this temperature for 40 minutes under stirring. Then, after cooling, the supernatant aqueous layer was removed by decantation, and 600 parts of water was further added. The mixture was heated to 90° C. and vigorously stirred and then cooled again. Then, the supernatant aqueous layer was removed in the same manner. Such an operation was repeated until the aqueous layer no longer showed alkaline nature, and finally water was thoroughly separated. The residue was heated for removal of water at 150° C. for 30 minutes under stirring to obtain an epoxy resin having a molecular weight of about 900.

200 parts of the epoxy resin thus obtained was dissolved in 200 parts of ethylene glycol monoethyl ether heated to 80° C. to obtain an epoxy resin solution (I) having a solid content of 50%.

Preparation of Epoxy Resin Solution (II)

Into a flask equipped with a stirrer, a thermometer and dropping funnel, 729.6 parts of bisphenol A, 160 parts of bisphenol F and 2,572 parts of a 10% sodium hydroxide aqueous solution were added, and the mixture was heated at 50° C. for 10 minutes under stirring. Then, 463 parts of epichlorohydrin was added thereto, and the mixture was heated to 100° C. under stirring and maintained at that temperature for 30 minutes.

Then, the supernatant aqueous layer was removed by decantation, and washing with boiling water was repeated until the aqueous layer no longer showed alkaline nature. Then, the residue was heated to 150° C. for removal of water to obtain an epoxy resin having a molecular weight of about 1,400.

300 parts of the epoxy resin thus obtained was dissolved in 300 parts of ethylene glycol monobutyl ether heated to 80° C. to obtain an epoxy resin solution (II) having a solid content of 50%.

Preparation of Epoxy Resin Solution (III)

Into a three-necked flask equipped with a reflux condenser, a thermometer and a stirrer, 680 parts of ethylene glycol monoethyl ether acetate was added and heated to 100° C. Then, 1,000 parts of an epoxy resin having an epoxy equivalent of from 2,800 to 3,300 obtained by reacting bisphenol A with epichlorohydrin, was gradually added and dissolved therein. Then, 25 parts of bisphenol F and 1 part of lithium chloride were added thereto, and the mixture was reacted at 200° C. for 60 minutes to obtain an epoxy resin solution (III) having a solid content of 60% and a molecular weight of about 7,000.

Preparation of Epoxy Resin Solution (IV)

An epoxy resin having a molecular weight of about 900 was prepared in the same manner as the Preparation of the epoxy resin solution (I) except that bisphenol A was changed to 72.9 parts, and bisphenol F was changed to 96 parts. Then, 200 parts of this epoxy resin was dissolved in 200 parts of ethylene glycol monoethyl ether heated to 100° C. to obtain an epoxy resin solution IV) having a solid content of 50%.

Preparation of Epoxy Resin Solution (V)

300 parts of bisphenol A type epoxy resin ("Epicoat 1001", tradename, manufactured by Shell Chemical Company, epoxy equivalent: 450-500) was dissolved in 300 parts of ethylene glycol monoethyl ether to obtain an epoxy resin solution (V) having a solid content of 50%.

Preparation of Epoxy Resin Solution (VI)

300 parts of a bisphenol F type epoxy resin ("Epichron 830", tradename, manufactured by Dainippon Ink & Chemicals Inc, epoxy equivalent: about 175) was dissolved in 300 parts of ethylene glycol monoethyl ether to obtain an epoxy resin solution (VI) having a solid content of 50%.

Preparation of Epoxy Resin Solution (VII)

The epoxy resin solution (V) and the epoxy resin solution (VI) were mixed in a ratio of 2 1 to obtain an epoxy resin solution (VII) having a solid content of 50%.

Preparation of Amine-Modified Epoxy Resin Solution (A-I)

180 parts of the epoxy resin solution (I) was heated to 60° C., and then 17.7 parts of diethanol amine was dropwise added over a period of 2 hours, and the mixture was further reacted at 70° C. for 3 hours to obtain a modified epoxy resin solution (A-I) having a solid content of 55%.

Preparation of Amine-Modified Epoxy Resin Solution (A-II)

To 280 parts of the above epoxy resin solution (II), 7.1 parts of diethanol amine was added, and the mixture was reacted in the same manner as the above solution (A-I) to obtain a modified epoxy resin solution (A-II) having a solid content of 51%.

Preparation of Amine-Modified Epoxy Resin Solution (A-III)

To 1,167 parts of the above epoxy resin solution (III), 7.5 parts of N-methylethanol amine was added, and the mixture was reacted in the same manner as the above solution (A-I) to obtain a modified epoxy resin solution (A-III) having a solid content of 60.2%.

Preparation of Amine-Modified Epoxy Resin Solution (A-IV)

To 450 parts of the above epoxy resin solution (I), 29.5 parts of n-propylamine was added, and the mixture was reacted in the same manner as the above solution (A-I) to obtain a modified epoxy resin solution (A-IV) having a solid content of 53%.

Preparation of Amine-Modified Epoxy Resin Solution (A-V)

To 450 parts of the above epoxy resin solution (I), 30.0 parts of ethylenediamine was added, and the mixture was reacted in the same manner as the above solution (A-I) to obtain a modified epoxy resin solution (A-V) having a solid content of 53%.

Preparation of Amine-Modified Epoxy Resin Solution (A-VI)

To 600 parts of the above epoxy resin solution (V), 55.4 parts of diethanolamine was added, and the mixture was reacted in the same manner as the above solution (A-I) to obtain a modified epoxy resin solution (A-VI) having a solid content of 54.2%.

Preparation of Amine-Modified Epoxy Resin Solution (A-VII)

To 600 parts of the above epoxy resin solution (VI), 143.9 parts of diethanol amine was added, and the mixture was reacted in the same manner as the above solution (A-I) to obtain a modified epoxy resin solution (A-VII) having a solid content of 59.7%.

Preparation of Amine-Modified Epoxy Resin Solution (A-VIII)

The above amine-modified epoxy resin solution (A-VI) and the amine-modified epoxy resin solution (A VII) were mixed in a ratio of 2:1 to obtain a modified epoxy resin solution (A-VIII) having a solid content of 57%.

Preparation of Polybasic Acid-Modified Epoxy Resin Solution (C-I)

180 parts of the above epoxy resin solution (I) was heated to 150° C., and 2 parts of hydroquinone, 1 part of dimethylbenzylamine and 26.6 parts of phthalic anhydride were added, and the mixture was reacted for 5 hours to obtain a modified epoxy resin solution (C-I) having a solid content of 56%.

Preparation of Polybasic Acid-Modified Epoxy Resin Solution (C-II)

To 280 parts of the above epoxy resin solution (II), 2.8 parts of hydroquinone, 1.5 parts of dimethylbenzylamine and 6.9 parts of maleic anhydride were added, and the mixture was reacted in the same manner as the above solution (C-I) to obtain a modified epoxy resin solution (C-II) having a solid content of 51%.

Preparation of Polybasic Acid-Modified Epoxy Resin Solution (C-III)

To 1,167 parts of the above epoxy resin solution (III), 4.5 parts of hydroquinone, 3.8 parts of dimethylbenzylamine and 14.6 parts of adipic acid were added, and the mixture was reacted in the same manner as above solution (C-I) to obtain a modified epoxy resin solution (C-III) having a solid content of 60.5%.

Preparation of Polybasic Acid-Modified Epoxy Resin Solution (C-IV)

To 600 parts of the above epoxy resin solution (V), 3 parts of hydroquinone, 2.5 parts of dimethylbenzylamine and 78.1 parts of phthalic anhydride were added, and the mixture was reacted in the same manner as the above solution (C-I) to obtain a modified epoxy resin solution (C-IV) having a solid content of 55.8%.

Preparation of Polybasic Acid-Modified Epoxy Resin Solution (C-V)

To 600 parts of the above epoxy resin solution (VI), 3 parts of hydroquinone, 2.5 parts of dimethylbenzylamine and 202.8 parts of phthalic anhydride were added, and the mixture was reacted in the same manner as the above solution (C-I) to obtain a modified epoxy resin solution (C-V) having a solid content of 62.6%.

Preparation of Polybasic Acid-Modified Epoxy Resin Solution (C-VI)

The above modified epoxy resin solution (C-IV) and the modified epoxy resin solution (C-V) were mixed in a ratio of 2:1 to obtain a modified epoxy resin solution (C-VI) having a solid content of 59.2%.

EXAMPLE 1

200 parts of the epoxy resin solution (I), 400 parts of colloidal silica ("ETC-ST", tradename, manufactured by Nissan Chemical Industries Ltd., dispersion in ethylene glycol monoethyl ether, solid content: 20%) and 418 parts of ethylene glycol monoethyl ether were mixed and dissolved to obtain a coating material.

The coating material thus obtained was coated by roll coating on various steel plates as identified in Table 2 so that the dried layer thickness would be 3 μm and baked under such condition that the peak metal temperature would be 150° C. in 30 seconds. Then, tests for corrosion resistance, cation electrodeposition coating properties, topcoat adhesion and water resistance were conducted, and the results are shown in Table 2.

EXAMPLES 2 TO 6 AND COMPARATIVE EXAMPLES 1 TO 4

The epoxy resin solution and silica particles were mixed in the proportions as identified in Table 1, and the mixture was dissolved in an ethylene glycol monoethyl ether in an amount to bring the solid content to a level of 20%, to obtain a coating material.

The coating material thus obtained was applied and subjected to various tests as in Example 1, and the results are shown in Table 2.

As shown in Table 2, in each of Examples 1 to 6 wherein the coating compositions of the present invention were employed, the corrosion resistance, the cation electrodeposition coating properties and the adhesion are all excellent.

On the other hand, in each of Comparative Example 1 wherein the coating material used was a bisphenol A type epoxy resin, Comparative Example 2 wherein the coating material used was an epoxy resin having a low proportion of bisphenol A, Comparative Example 3 wherein a bisphenol F type epoxy resin was used, but the coating material used contained no silica particles and Comparative Example 4 wherein the coating material used was a mixture of a bisphenol A type epoxy resin and a bisphenol F type epoxy resin, the corrosion resistance, the cation electrodeposition coating properties and the adhesion were all inferior as compared with those of the present invention.

TABLE 1

|  | Examples | | | | | | Comparative Examples | | | |
| --- | --- | --- | --- | --- | --- | --- | --- | --- | --- | --- |
|  | 1 | 2 | 3 | 4 | 5 | 6 | 1 | 2 | 3 | 4 |
| Epoxy resin solution | I 200 | I 200 | II 200 | II 200 | III 167 | III 167 | V 200 | IV 200 | VI 200 | VII 200 |
| Silica particles | Colloidal silica*1 400 | Fumed silica*2 7 | Fumed silica*2 350 | Colloidal silica*3 120 | Colloidal silica*3 100 | Fumed silica*4 40 | Colloidal silica*1 400 | Fumed silica*2 2 | — | Colloidal silica*1 400 |
| Bis-phenol A/Bis-phenol F | 63/37 | 63/37 | 82/18 | 82/18 | 93/7 | 93/7 | 100/0 | 43/57 | 0/100 | — |

*1) "ETC-ST", tradename, manufactured by Nissan Chemical Industries Ltd., dispersion in ethylene glycol monoethyl ether, solid content: 20%
*2) "R972", tradename, manufactured by Nippon Aerosil K.K.
*3) "OSCAL 1632", tradename, manufactured by Catalysts & Chemicals Industries Co., Ltd., dispersion in ethylene glycol monoethyl ether, solid content: 20%
*4) "RX200", tradename, manufactured by Nippon Aerosil K.K.

TABLE 2

|  | Examples | | | | | |
| --- | --- | --- | --- | --- | --- | --- |
|  | 1 | 2 | 3 | 4 | 5 | 6 |
| Type of steel plate | Hot dip zinc-plated steel plate | Electrolytic zinc-plated steel plate | Electrolytic zinc-nickel alloy-plated steel plate | Electrolytic zinc-plated steel plate | Electrolytic zinc-nickel alloy-plated steel plate | Cold rolled steel plate |
| Tested items |  |  |  |  |  |  |
| Corrosion resistance*5) | ○ | ○ | ○ | ○ | ○ | ○ |
| Cation electrodeposition coating properties*6) | ○ | ○ | ○ | ○ | ○ | ○ |
| Topcoat adhesion*7) | ○ | ○ | ○ | ○ | ○ | ○ |
| Water resistance*8) | ○ | ○ | ○ | ○ | ○ | ○ |

|  | Comparative Examples | | | |
| --- | --- | --- | --- | --- |
|  | 1 | 2 | 3 | 4 |
| Type of steel plate | Hot dip zinc-plated | Electrolytic zinc-plated | Electrolytic zinc-nickel | Hot dip zinc-plated |

TABLE 2-continued

|  | steel plate | steel plate | alloy-plated steel plate | steel plate |
| --- | --- | --- | --- | --- |
| Tested items |  |  |  |  |
| Corrosion resistance*5) | Δ | Δ | X | Δ |
| Cation electrodeposition coating properties*6) | X | Δ | X | Δ |
| Topcoat adhesion*7) | X | X | X | Δ |
| Water resistance*8) | X | X | X | Δ |

*5) Cross cut lines were imparted to the coated surface of the test sheet, and salt spray test was conducted for 500 hours in accordance with JIS Z-2371, whereupon formation of red rust was observed. ◯: No formation of red rust, Δ: less than 5% of red rust, X: at least 5% of red rust.
*6) On the coated surface of the test sheet, an amine-added epoxy resin-block isocyanate type cationic electrodeposition coating material was coated by cation electrodeposition under a condition of 100 V for 3 minutes at a bath temperature of 28° C. and baked at 165° C. for 20 minutes, whereupon the appearance of the coated layer (area: 100 cm²) was observed. ◯: Formation of gas pin holes and craters: from 0 to 5 points, Δ: Formation of gas pin holes and craters: 6–20 points, X: Formation of gas pin holes and craters: at least 20 points.
*7) The coated surface of the cation electrodeposition coated plate obtained in *6) was cross-cut by a cutter knife into 100 squares of 1 mm², and peel test was conducted by means of an adhesive tape to measure the remaining rate of the electrodeposition coated layer. ◯: 95–100%, Δ: 90–94%, X: less than 89%.
*8) The cation electrodeposition coated plate obtained in *6) was immersed in water of 40° C. for 240 hours and then dried, and subjected to the peel test in the same manner as in *7) to measure the remaining rate of the electrodeposition coated layer. ◯: 95–100%, Δ: 90–94%, X: less than 89%.

EXAMPLE 7

200 parts of the epoxy resin solution (I), 400 parts of colloidal silica ("ETC-ST", tradename, manufactured by Nissan Chemical Industries Ltd., dispersion in ethylene glycol monoethyl ether, solid content: 20%), 3 parts of graphite powder ("Hitasol GP-60", tradename, manufactured by Hitachi Funmatsu Yakin K. K., average particle size: 0.5 μm) and 420 parts of ethylene glycol monoethyl ether were mixed and dissolved to obtain a coating material.

The coating material thus obtained was coated by roll coating on various steel plates as identified in Table 4 so that the dried layer thickness would be 3 μm and then baked so that the maximum plate temperature would be 150° C. in 30 seconds. Then, tests for the corrosion resistance, cation electrodeposition coating properties, topcoat adhesion, water resistance and weldability were conducted, and the results are shown in Table 4.

EXAMPLES 8 TO 12 AND COMPARATIVE EXAMPLES 5 TO 8

An epoxy resin solution, silica particles and graphite particles were blended in the proportions as identified in Table 3, and the mixture was dissolved in ethylene glycol monoethyl ether in an amount to bring the solid content to 20% to obtain a coating material.

The coating material thus obtained was applied and subjected to various tests in the same manner as in Example 7, and the results are shown in Table 4.

As shown in Table 4, in Examples 7 to 12 wherein the coating compositions of the present invention were used, the corrosion resistance, the cation electrodeposition coating properties, the adhesion and the weldability are all excellent.

On the other hand, in each of Comparative Example 5 wherein the coating material used was a bisphenol A type epoxy resin, Comparative Example 6 wherein the coating material used was an epoxy resin having a low proportion of bisphenol A, Comparative Example 7 wherein a bisphenol F type epoxy resin was used, but the coating material used contained no silica particles and graphite particles and Comparative Example 8 wherein the coating material used was a mixture of a bisphenol A type epoxy resin and a bisphenol F type epoxy resin, the corrosion resistance, the cation electrodeposition coating properties, the adhesion and the weldability were all inferior as compared with those of the present invention.

TABLE 3

|  | Examples | | | | | | Comparative Examples | | | |
| --- | --- | --- | --- | --- | --- | --- | --- | --- | --- | --- |
|  | 7 | 8 | 9 | 10 | 11 | 12 | 5 | 6 | 7 | 8 |
| Epoxy resin solution | I 200 | I 200 | II 200 | II 200 | III 167 | III 167 | V 200 | IV 200 | VI 200 | VII 200 |
| Silica particles | Colloidal silica*1 400 | Fumed silica*2 7 | Fumed silica*2 350 | Colloidal silica*3 120 | Colloidal silica*3 100 | Fumed silica*4 40 | Colloidal silica*1 400 | Fumed silica*2 2 | — | Colloidal silica*1 400 |
| Graphite particles | Powder*9 3 | Solvent dispersion*10 150 | Powder*9 25 | Solvent dispersion*10 5 | Solvent dispersion*11 200 | Solvent dispersion*11 30 | Powder*9 3 | Powder*9 50 | — | Powder*9 3 |
| Bisphenol A/Bisphenol F | 63/37 | 63/37 | 82/18 | 82/18 | 93/7 | 93/7 | 100/0 | 43/57 | 0/100 | — |

*9) "Hitasol GP-60", tradename, manufactured by Hitachi Funmatsu Yakin K.K., average particle size: 0.5 μm
*10) "Baneyphite C-9A", tradename, manufactured by Nippon Kokuen Shoji K.K., average particle size: 0.5 μm, solid content: 8%
*11) "Hitazol GO-102", tradename, manufactured by Hitachi Funmatsu Yakin K.K., average particle size: 1.0 μm, solid content: 10%

TABLE 4

|  | Examples | | | | | |
| --- | --- | --- | --- | --- | --- | --- |
|  | 7 | 8 | 9 | 10 | 11 | 12 |
| Type of steel plate | Hot dip zinc-plated | Electrolytic zinc-plated | Electrolytic zinc-nickel | Electrolytic zinc-plated | Electrolytic zinc-nickel | Cold rolled steel plate |

TABLE 4-continued

|  | steel plate | steel plate | alloy-plated steel plate | steel plate | alloy-plated steel plate | |
|---|---|---|---|---|---|---|
| Tested items |  |  |  |  |  |  |
| Corrosion resistance*5) | ◯ | ◯ | ◯ | ◯ | ◯ | ◯ |
| Cation electrodeposition coating properties*6) | ◯ | ◯ | ◯ | ◯ | ◯ | ◯ |
| Topcoat adhesion*7) | ◯ | ◯ | ◯ | ◯ | ◯ | ◯ |
| Water resistance*8) | ◯ | ◯ | ◯ | ◯ | ◯ | ◯ |
| Weldability*12) | ◯ | ◯ | ◯ | ◯ | ◯ | ◯ |

|  | Comparative Examples | | | |
|---|---|---|---|---|
|  | 5 | 6 | 7 | 8 |
| Type of steel plate | Hot dip zinc-plated steel plate | Electrolytic zinc-plated steel plate | Electrolytic zinc-nickel alloy-plated steel plate | Hot dip zinc-plated steel plate |
| Tested items |  |  |  |  |
| Corrosion resistance*5) | Δ | Δ | X | X |
| Cation electrodeposition coating properties*6) | X | Δ | X | Δ |
| Topcoat adhesion*7) | X | X | X | Δ |
| Water resistance*8) | X | X | X | X |
| Weldability*12) | Δ | Δ | X | X |

*12) Two sheets of each test plate were put together in an overlapping fashion under a condition of welding time of 10 cc under pressing pressure of 170 kg with electrode R type (40R), whereupon the continuous welding points were examined. ◯: at least 900 points, Δ: 500–899 points, X: less than 499 points

EXAMPLE 13

200 parts of the modified epoxy resin solution (A-1), 400 parts of colloidal silica ("ETC-ST", tradename, manufactured by Nissan Chemical Industries Ltd., dispersion in ethylene glycol monoethyl ether, solid content: 20%) and 418 parts of ethylene glycol monoethyl ether were mixed and dissolved to obtain a coating material.

The coating material thus obtained was coated by roll coating on various steel plates as identified in Table 6 so that the dried layer thickness would be 3 μm and then baked so that the maximum plate temperature would be 150° C. in 30 seconds. Then, tests for the corrosion resistance, cation electrodeposition coating properties, topcoat adhesion, water resistance and alkaline resistance were conducted, and the results are shown in Table 6.

EXAMPLES 14 TO 20 AN COMPARATIVE EXAMPLES 9 TO 11

A modified epoxy resin solution and silica particles were blended in the proportions as identified in Table 5, and the mixture was dissolved in ethylene glycol monoethyl ether in an amount to bring the solid content to 20% to obtain a coating material.

The coating material thus obtained was applied and subjected to various tests in the same manner as in Example 13, and the results are shown in Table 6.

As shown in Table 6, in Examples 13 to 20 wherein the coating compositions of the present invention were used, the corrosion resistance, the cation electrodeposition coating properties, the adhesion and the alkali resistance are all excellent.

On the other hand, in each of Comparative Example 9 wherein an epoxy resin having no bisphenol F skeleton was employed, Comparative Example 10 wherein an epoxy resin having no bisphenol A skeleton was employed, and Comparative Example 11 wherein a mixture of an amine-modified bisphenol A type epoxy resin and an amine-modified bisphenol F type epoxy resin was used, the corrosion resistance, the cation electrodeposition coating properties, the adhesion and the alkali resistance were all inferior as compared with those of the present invention.

TABLE 5

|  | Examples | | | | | | | | Comparative Examples | | |
|---|---|---|---|---|---|---|---|---|---|---|---|
|  | 13 | 14 | 15 | 16 | 17 | 18 | 19 | 20 | 9 | 10 | 11 |
| Epoxy resin solution | A-I 200 | A-I 200 | A-II 200 | A-II 200 | A-III 167 | A-III 167 | A-IV 200 | A-V 200 | A-VI 200 | A-VII 200 | A-VIII 200 |
| Silica particles | Colloidal silica*1 400 | Fumed silica*2 7 | Fumed silica*2 350 | Colloidal silica*3 120 | Colloidal silica*3 100 | Fumed silica*4 40 | Colloidal silica*1 400 | Colloidal silica*1 400 | Colloidal silica*1 400 | — — | Colloidal silica*1 400 |
| Bis-phenol A/Bis-phenol F | 63/37 | 63/37 | 82/18 | 82/18 | 93/7 | 93/7 | 63/37 | 63/37 | 100/0 | 0/100 | — |
| Amine modification rate (%) of the epoxy resin | 84 | 84 | 34 | 34 | 50 | 50 | 100 | 100 | 80 | 80 | 80 |

TABLE 6

|  | Examples | | | | | | | |
|---|---|---|---|---|---|---|---|---|
|  | 13 | 14 | 15 | 16 | 17 | 18 | 19 | 20 |
| Type of steel plate | Hot dip zinc-plated steel plate | Electrolytic zinc-plated steel plate | Electrolytic zinc-nickel alloy-plated steel plate | Electrolytic zinc-plated steel plate | Electrolytic zinc-nickel alloy-plated steel plate | Cold rolled steel plate | Hot dip zinc-plated steel plate | Hot dip zinc-plated steel plate |

TABLE 6-continued

| Tested items | | | | | | | | |
|---|---|---|---|---|---|---|---|---|
| Corrosion resistance*5) | ○ | ○ | ○ | ○ | ○ | ○ | ○ | ○ |
| Cation electrodeposition coating properties*6) | ○ | ○ | ○ | ○ | ○ | ○ | ○ | ○ |
| Topcoat adhesion*7) | ○ | ○ | ○ | ○ | ○ | ○ | ○ | ○ |
| Water resistance*13) | ○ | ○ | ○ | ○ | ○ | ○ | ○ | ○ |
| Alkali resistance*14) | ○ | ○ | ○ | ○ | ○ | ○ | ○ | ○ |

| | Comparative Examples | | |
|---|---|---|---|
| | 9 | 10 | 11 |
| Type of steel plate | Hot dip zinc-plated steel plate | Electrolytic zinc-nickel alloy-plated steel plate | Hot dip zinc-plated steel plate |
| Tested items | | | |
| Corrosion resistance*5) | Δ | X | X |
| Cation electrodeposition coating properties*6) | X | X | Δ |
| Topcoat adhesion*7) | X | X | Δ |
| Water resistance*13) | Δ | X | X |
| Alkali resistance*14) | Δ | Δ | X |

*13) The cation electrodeposition coated-plate obtained in *6) was immersed in water of 40° C. for 360 hours and then dried and subjected to peel test in the same manner as in *7), whereby the remaining rate of the electrodeposition coated-layer was measured. ○: 95–100%, Δ: 90–94%, X: less than 89%.
*14) A test plate was immersed in an alkaline degreasing solution of 45° C. ("Grandacarina 26F", tradename, manufactured by Million Kagaku K.K.), then washed with water and dried, and then subjected to peel test in the same manner as in *7), whereby the remaining rate of the coated layer was measured. ○: 95–100%, Δ: 90–94%, X: less than 89%.

EXAMPLE 21

200 parts of the modified epoxy resin solution (A-I), parts of colloidal silica ("ETC-ST", tradename, manufactured by Nissan Chemical Industries Ltd., dispersion in ethylene glycol monoethyl ether, solid content: 20%), 3 parts of graphite particles ("Hitasol GP-60", tradename, manufactured by Hitachi Funmatsu Yakin K. K., average particle size: 0.5 μm) and 418 parts of ethylene glycol monoethyl ether were mixed and dissolved to obtain a coating material. The coating material thus obtained was coated by roll coating on various steel plates as identified in Table 8 so that the dried layer thickness would be 3 μm and then baked so that the maximum plate temperature would be 150° C. in 30 seconds. Then, tests for the corrosion resistance, cation electrodeposition coating properties, topcoat adhesion, water resistance, alkali resistance and weldability were conducted, and the results are shown in Table 8.

EXAMPLES 22 TO 28 AND COMPARATIVE EXAMPLES 12 TO 14

A modified epoxy resin solution, silica particles and graphite particles were blended in the proportions as identified in Table 7, and the mixture was dissolved in ethylene glycol monoethyl ether in an amount to bring the solid content to 20% to obtain a coating material. The coating material thus obtained was applied and subjected to various tests in the same manner as in Example 21, and the results are shown in Table 8.

As shown in Table 8, in Examples 21 to 28 wherein the coating compositions of the present invention were used, the corrosion resistance, the cation electrodeposition coating properties, the adhesion, the alkali resistance and the weldability were all excellent.

On the other hand, in each of Comparative Example 12 wherein an epoxy resin having no bisphenol F skeleton was used, Comparative Example 13 wherein an epoxy resin having no bisphenol A skeleton was used, and Comparative Example 14 wherein a mixture of an amine-modified bisphenol A type epoxy resin and an amine-modified bisphenol F type epoxy resin was used, the corrosion resistance, the cation electrodeposition coating properties, the adhesion, the alkali resistance and the weldability were all inferior as compared with those of the present invention.

TABLE 7

| | Examples | | | | | | | |
|---|---|---|---|---|---|---|---|---|
| | 21 | 22 | 23 | 24 | 25 | 26 | 27 | 28 |
| Epoxy resin solution | A-I 200 | A-I 200 | A-II 200 | A-II 200 | A-III 167 | A-III 167 | A-IV 200 | A-V 200 |
| Silica particles | Colloidal silica*1 400 | Fumed silica*2 7 | Fumed silica*2 350 | Colloidal silica*3 120 | Colloidal silica*3 100 | Fumed silica*4 40 | Colloidal silica*1 400 | Colloidal silica*1 400 |
| Graphite particles | Powder*9 3 | Solvent dispersion*10 150 | Powder*9 25 | Solvent dispersion*10 5 | Solvent dispersion*11 200 | Solvent dispersion*11 30 | Powder*9 10 | Powder*9 10 |
| Bis-phenol A/Bis-phenol F | 63/37 | 63/37 | 82/18 | 82/18 | 93/7 | 93/7 | 63/37 | 63/37 |
| Amine modification rate (%) of the epoxy resin | 84 | 84 | 34 | 34 | 50 | 50 | 100 | 100 |

| | Comparative Examples | | |
|---|---|---|---|
| | 12 | 13 | 14 |
| Epoxy resin solution | A-VI 200 | A-VII 200 | A-VIII 200 |

TABLE 7-continued

| Silica particles | Colloidal silica*1 400 | — | Colloidal silica*1 400 |
|---|---|---|---|
| Graphite particles | Powder*9 3 | — | Powder*9 3 |
| Bis-phenol A/Bis-phenol F | 100/0 | 0/100 | — |
| Amine modification rate (%) of the epoxy resin | 80 | 80 | 80 |

TABLE 8

| | Examples | | | | | | | |
|---|---|---|---|---|---|---|---|---|
| | 21 | 22 | 23 | 24 | 25 | 26 | 27 | 28 |
| Type of steel plate | Hot dip zinc-plated steel plate | Electrolytic zinc-plated steel plate | Electrolytic zinc-nickel alloy-plated steel plate | Electrolytic zinc-plated steel plate | Electrolytic zinc-nickel alloy-plated steel plate | Cold rolled steel plate | Hot dip zinc-plated steel plate | Hot dip zinc-plated steel plate |
| Tested items | | | | | | | | |
| Corrosion resistance*5) | ○ | ○ | ○ | ○ | ○ | ○ | ○ | ○ |
| Cation electrodeposition coating properties*6) | ○ | ○ | ○ | ○ | ○ | ○ | ○ | ○ |
| Topcoat adhesion*7) | ○ | ○ | ○ | ○ | ○ | ○ | ○ | ○ |
| Water resistance*13) | ○ | ○ | ○ | ○ | ○ | ○ | ○ | ○ |
| Alkali resistance*14) | ○ | ○ | ○ | ○ | ○ | ○ | ○ | ○ |
| Weldability*12) | ○ | ○ | ○ | ○ | ○ | ○ | ○ | ○ |

| | Comparative Examples | | |
|---|---|---|---|
| | 12 | 13 | 14 |
| Type of steel plate | Hot dip zinc-plated steel plate | Electrolytic zinc-nickel alloy-plated steel plate | Hot dip zinc-plated steel plate |
| Tested items | | | |
| Corrosion resistance*5) | Δ | X | X |
| Cation electrodeposition coating properties*6) | X | X | Δ |
| Topcoat adhesion*7) | X | X | Δ |
| Water resistance*13) | Δ | X | X |
| Alkali resistance*14) | Δ | X | X |
| Weldability*12) | Δ | X | X |

EXAMPLE 29

200 parts of the modified epoxy resin solution (C-I), 400 parts of colloidal silica ("ETC-ST", tradename, manufactured by Nissan Chemical Industries Ltd., dispersion in ethylene glycol monoethyl ether, solid content: 20%) and 418 parts of ethylene glycol monoethyl ether were mixed and dissolved to obtain a coating material.

The coating material thus obtained was coated by roll coating on various steel plates as identified in Table 10 so that the dried layer thickness would be 3 μm, and then baked so that the maximum plate temperature would be 150° C. in 30 seconds. Then, tests for the corrosion resistance, cation electrodeposition coating properties, topcoat adhesion, water resistance and alkali resistance were conducted, and the results are shown in Table 10.

EXAMPLES 30 TO 34 AND COMPARATIVE EXAMPLES 15 TO 17

A modified epoxy resin solution and silica particles were blended in the proportions as identified in Table 9, and the mixture was dissolved in ethylene glycol monoethyl ether in an amount to bring the solid content to 20% to obtain a coating material.

The coating material thus obtained was applied and subjected to various tests in the same manner as in Example 29, and the results are shown in Table 10.

As shown in Table 10, in Examples 29 to 34 wherein the coating compositions of the present invention were used, the corrosion resistance, the cation electrodeposition coating properties, the adhesion and the alkali resistance were all excellent.

On the other hand, in each of Comparative Example 15 wherein an epoxy resin having no bisphenol F skeleton was used, Comparative Example 16 wherein an epoxy resin having no bisphenol A skeleton was used, and Comparative Example 17 wherein a mixture of a polybasic acid-modified bisphenol A type epoxy resin and a polybasic acid-modified bisphenol F type epoxy resin was used, the corrosion resistance, the cation electrodeposition coating properties, the adhesion and the alkali resistance were all inferior as compared with those of the present invention.

TABLE 9

| | Examples | | | | | | Comparative Examples | | |
|---|---|---|---|---|---|---|---|---|---|
| | 29 | 30 | 31 | 32 | 33 | 34 | 15 | 16 | 17 |
| Epoxy resin solution | C-I | C-I | C-II | C-II | C-III | C-III | C-IV | C-V | C-VI |

TABLE 9-continued

|  | Examples | | | | | | Comparative Examples | | |
|---|---|---|---|---|---|---|---|---|---|
|  | 29 | 30 | 31 | 32 | 33 | 34 | 15 | 16 | 17 |
| Silica particles | 200 Colloidal silica*1 400 | 200 Fumed silica*2 7 | 200 Fumed silica*2 350 | 200 Colloidal silica*3 120 | 167 Colloidal silica*3 100 | 167 Fumed silica*4 40 | 200 Fumed silica*4 400 | 200 — — | 200 Colloidal silica*1 400 |
| Bis-phenol A/Bis-phenol F | 63/37 | 63/37 | 82/18 | 82/18 | 93/7 | 93/7 | 100/0 | 0/100 | — |
| Polybasic acid modification rate (%) of the epoxy resin | 90 | 90 | 35 | 35 | 50 | 50 | 80 | 80 | 80 |

TABLE 10

| | Examples | | | | | |
|---|---|---|---|---|---|---|
| | 29 | 30 | 31 | 32 | 33 | 34 |
| Type of steel plate | Hot dip zinc-plated steel plate | Electrolytic zinc-plated steel plate | Electrolytic zinc-nickel alloy-plated steel plate | Electrolytic zinc-plated steel plate | Electrolytic zinc-nickel alloy-plated steel plate | Cold rolled steel plate |
| Tested items | | | | | | |
| Corrosion resistance*5) | ○ | ○ | ○ | ○ | ○ | ○ |
| Cation electrodeposition coating properties*6) | ○ | ○ | ○ | ○ | ○ | ○ |
| Topcoat adhesion*7) | ○ | ○ | ○ | ○ | ○ | ○ |
| Water resistance*13) | ○ | ○ | ○ | ○ | ○ | ○ |
| Alkali resistance*14) | ○ | ○ | ○ | ○ | ○ | ○ |

| | Comparative Examples | | |
|---|---|---|---|
| | 15 | 16 | 17 |
| Type of steel plate | Hot dip zinc-plated steel plate | Electrolytic zinc-nickel alloy-plated steel plate | Hot dip zinc-plated steel plate |
| Tested items | | | |
| Corrosion resistance*5) | Δ | X | X |
| Cation electrodeposition coating properties*6) | X | X | Δ |
| Topcoat adhesion*7) | X | X | Δ |
| Water resistance*13) | Δ | X | X |
| Alkali resistance*14) | Δ | X | X |

EXAMPLE 35

200 parts of the modified epoxy resin solution (C-I), 400 parts of colloidal silica ("ETC-ST", tradename, manufactured by Nissan Chemical Industries Ltd., dispersion in ethylene glycol monoethyl ether, solid content: 20%), 3 parts of graphite particles ("Hitasol GP-60", tradename, manufactured by Hitachi Funmatsu Yakin K. K., average particle size: 0.5 μm) and 418 parts of ethylene glycol monoethyl ether were mixed and dissolved to obtain a coating material.

The coating material thus obtained was coated by roll coating on various steel plates as identified in Table 12 so that the dried layer thickness would be 3 μm and then baked so that the maximum plate temperature would be 150° C. in 30 seconds. Then, tests for the corrosion resistance, cation electrodeposition coating properties, topcoat adhesion, water resistance, alkali resistance and weldability were conducted, and the results are shown in Table 12.

EXAMPLES 36 TO 40 AND COMPARATIVE EXAMPLES 18 TO 20

A modified epoxy resin solution, silica particles and graphite particles were blended in the proportions as identified in Table 11, and the mixture was dissolved in ethylene glycol monoethyl ether in an amount to bring the solid content to 20% to obtain a coating material.

The coating material thus obtained was applied and subjected to various tests in the same manner as in Example 35, and the results are shown in Table 12.

As shown in Table 12, in each of Examples 35 to 40 wherein the coating compositions of the present invention were used, the corrosion resistance, the cation electrodeposition coating properties, the adhesion, the alkali resistance and the weldability were all excellent.

On the other hand, in each of Comparative Example 18 wherein an epoxy resin having no bisphenol F skeleton was used, Comparative Example 19 wherein an epoxy resin having no bisphenol A skeleton was used, and Comparative Example 20 wherein a mixture of a polybasic acid-modified bisphenol A type epoxy resin and a polybasic acid-modified bisphenol F type epoxy resin was used, the corrosion resistance, the cation electrodeposition coating properties, the adhesion, the alkali resistance and the weldability were all inferior as compared with those of the present invention.

TABLE 11

| | Examples | | | | | | Comparative Examples | | |
|---|---|---|---|---|---|---|---|---|---|
| | 35 | 36 | 37 | 38 | 39 | 40 | 18 | 19 | 20 |
| Epoxy resin solution | C-I 200 | C-I 200 | C-II 200 | C-II 200 | C-III 167 | C-III 167 | C-IV 200 | C-V 200 | C-VI 200 |
| Silica | Colloidal | Fumed | Fumejd | Colloidal | Colloidal | Fumed | Fumed | — | Colloidal |

TABLE 11-continued

| | Examples | | | | | | Comparative Examples | | |
|---|---|---|---|---|---|---|---|---|---|
| | 35 | 36 | 37 | 38 | 39 | 40 | 18 | 19 | 20 |
| particles | silica*1 400 | silica*2 7 | silica*2 350 | silica*3 120 | silica*3 100 | silica*4 40 | silica*4 400 | — | silica*1 400 |
| Graphite particles | Powder*9 3 | Solvent dispersion*10 150 | Powder*9 25 | Solvent dispersion*10 5 | Solvent dispersion*11 200 | Solvent dispersion*11 30 | Powder*9 3 | — | Powder*9 3 |
| Bisphenol A/ Bisphenol F | 63/37 | 63/37 | 82/18 | 82/18 | 93/7 | 93/7 | 100/0 | 0/100 | — |
| Polybasic acid modification rate (%) of the epoxy resin | 90 | 90 | 35 | 35 | 50 | 50 | 80 | 80 | 80 |

TABLE 12

| | Examples | | | | | |
|---|---|---|---|---|---|---|
| | 35 | 36 | 37 | 38 | 39 | 40 |
| Type of steel plate | Hot dip zinc-plated steel plate | Electrolytic zinc-plated steel plate | Electrolytic zinc-nickel alloy-plated steel plate | Electrolytic zinc-plated steel plate | Electrolytic zinc-nickel alloy-plated steel plate | Cold rolled steel plate |
| Tested items | | | | | | |
| Corrosion resistance*5) | O | O | O | O | O | O |
| Cation electrodeposition coating properties*6) | O | O | O | O | O | O |
| Topcoat adhesion*7) | O | O | O | O | O | O |
| Water resistance*13) | O | O | O | O | O | O |
| Alkali resistance*14) | O | O | O | O | O | O |
| Weldability*12) | O | O | O | O | O | O |

| | Comparative Examples | | |
|---|---|---|---|
| | 18 | 19 | 20 |
| Type of steel plate | Hot dip zinc-plated steel plate | Electrolytic zinc-nickel alloy-plated steel plate | Hot dip zinc-plated steel plate |
| Tested items | | | |
| Corrosion resistance*5) | Δ | X | X |
| Cation electrodeposition coating properties*6) | X | X | Δ |
| Topcoat adhesion*7) | X | X | Δ |
| Water resistance*13) | Δ | X | X |
| Alkali resistance*14) | Δ | X | X |
| Weldability*12) | Δ | X | X |

We claim:

1. A method for imparting corrosion resistance and cationic electrodeposition coating properties to a steel plate, comprising:
   coating a surface of a steel plate with a liquid coating composition comprising:
   (i) 100 parts by weight of a bisphenol epoxy resin comprising bisphenol skeletons and epichlorohydrin skeletons and having at least two epoxy groups per molecule, said bisphenol skeletons comprising bisphenol A skeletons and bisphenol F skeletons in a weight ratio of from 95:5 to 60:40, and
   (ii) from 5 to 400 parts by weight of colloidal silica dispersed in an organic solvent or powdery fumed silica; and curing said coating.

2. The method according to claim 1, wherein said bisphenol epoxy resin has a molecular weight of from about 500 to 100,000.

3. The method according to claim 1, wherein said bisphenol epoxy resin is modified by reaction with a primary amine compound, a secondary amine compound, a polybasic acid compound or mixtures thereof to such an extent that from 30 to 100% of said epoxy resin groups in said bisphenol epoxy resin are modified with said amine compound or said acid compound.

4. The method according to claim 3, wherein said amine compound is selected from the group consisting of n-propylamine, iso-propylamine, n-butylamine, sec-butylamine, tert-butylamine, diethylamine, ethylenediamine, diethylenetriamine, triethylenediamine, tetraethylenediamine, propylenediamine, N-methylpiperazine, ethanolamine, diethanolamine, N-methylethanolamine, isopropanolamine, diisopropanolamine, n-propanolamine, ethylethanolamine and 3-methanolpiperidine.

5. The method according to claim 3, wherein said acid compound is selected from the group consisting of isophthalic acid, terephthalic acid, succinic acid, adipic acid, fumaric acid, itaconic acid, citraconic acid, maleic anhydride, phthalic anhydride, succinic anhydride, citric acid, tartaric acid, rosin maleic acid and benzene tricarboxylic anhydride.

6. The method according to claim 1, wherein said colloidal silica has a particle size of from 1 to 500 mμm.

7. The method according to claim 1, wherein said powdery fumed silica has a particle size of from 1 to 500 mμm.

8. The method according to claim 1, wherein said liquid coating composition further comprises (iii) from 0.1 to 30 parts by weight of graphite particles, said graphite particles having a size of at most 1 μm.

9. The method according to claim 1, wherein said coating is cured at a temperature of from 15° to 300° C.

10. The method according to claim 9, wherein said coating is cured at a temperature of from 100° to 250° C.

11. The method according to claim 1, wherein said steel plate is selected from the group consisting of hot dip zinc-plated steel plate, hot dip zinc-aluminum alloy-plated steel plate, electrolytic zinc-plated steel plate, electrolytic zinc-nickel alloy-plated steel plate, electrolytic zinc-iron alloy-plated steel plate, electrolytic zinc-iron double layer-plated steel plate, cold-rolled steel plate, chromate treated steel plate and phosphate treated steel plate.

12. A method for forming on a steel plate a coating layer excellent in corrosion resistance and cationic electrodeposition coating properties which comprises coating on a surface of the steel plate a liquid coating composition comprising (1) (100) parts by weight of a bisphenol epoxy resin comprising bisphenol skeletons and epichlorohydrin skeletons and having at least two epoxy groups per molecule, said bisphenol skeletons comprising bisphenol A skeletons and bisphenol F skeletons in a weight ratio of from 95:5 to 60:40; and (ii) from 5 to 400 parts by weight of colloidal silica dispersed in an organic solvent or powdery fumed silica.

13. The method according to claim 12, wherein the steel plate is a surface-treated steel plate.

14. The method according to claim 12, wherein the steel plate is a plated steel plate.

* * * * *